United States Patent [19]

Stovicek

[11] Patent Number: 5,084,096
[45] Date of Patent: Jan. 28, 1992

[54] BIOCIDAL COMPOSITIONS BASED ON POLYMERS OF DIHYDROXY QUATERNARY AMMONIUM SALTS

[76] Inventor: Pavel Stovicek, 225 Warrick St., Coquitlam, British Columbia, Canada, V3K 6C1

[21] Appl. No.: 505,252

[22] Filed: Apr. 5, 1990

[30] Foreign Application Priority Data

Apr. 6, 1989 [CA] Canada ............................ 595836

[51] Int. Cl.$^5$ .................. C09D 5/00; C08G 65/48
[52] U.S. Cl. .................. 106/18.21; 106/18.32; 525/390; 525/437; 525/453; 525/467; 525/523
[58] Field of Search .................. 106/18.21, 18.32; 525/390, 437, 453, 467, 523

[56] References Cited

U.S. PATENT DOCUMENTS

| | | | |
|---|---|---|---|
| 3,277,097 | 10/1966 | Wakeman et al. | 106/18.32 |
| 3,299,073 | 1/1967 | Wakeman et al. | 106/18.32 |
| 3,435,039 | 3/1969 | Wakeman et al. | 106/18.32 |
| 4,282,366 | 8/1981 | Eudy | 106/18.32 |
| 4,379,890 | 4/1983 | Konietzny et al. | 106/18.32 |
| 4,496,613 | 1/1985 | Zagefka et al. | 106/18.32 |

FOREIGN PATENT DOCUMENTS

| | | | |
|---|---|---|---|
| 53-121929 | 10/1978 | Japan | 106/18.32 |
| 53-124538 | 10/1978 | Japan | 106/18.32 |

*Primary Examiner*—Mark L. Bell
*Assistant Examiner*—Anthony J. Green
*Attorney, Agent, or Firm*—Darby & Darby

[57] ABSTRACT

Biocidally active surface coating compositions have excellent resistance to attack by algae, fungi, and other microorganisms and have high activity against the deposition of biota. The surface coatings exhibit antimicrobial activity against a broad range of microoganisms when bonded to a variety of surfaces. The active chemical is not removed from these surfaces even after repeated washing with water or submerging the surfaces in water for an extended period of time. This antimicrobial activity is not attributed to a slow release of the active ingredient, but rather to the active non-leachable surface. The active quaternary ammonium compounds in monomeric forms have the structural formulas as follows:

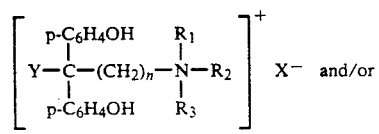

and/or

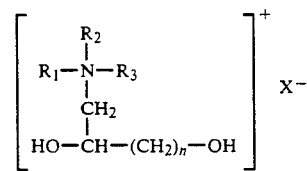

wherein $R_1$, $R_2$, and $R_3$ each represents an unsubstituted or substituted alkyl or hydroxalkyl group or a derivative thereof having from 1 to 20 carbon atoms; Y represents hydrogen, an unsubstituted or substituted alkyl group, or a derivative thereof having up to 10 carbon atoms; and $X^-$ represents an anionic group such as $Cl^-$, $Br^-$, $I^-$, $OH^-$, or $HSO_4^-$.

15 Claims, No Drawings

BIOCIDAL COMPOSITIONS BASED ON POLYMERS OF DIHYDROXY QUATERNARY AMMONIUM SALTS

FIELD OF THE INVENTION

This invention relates to biocidally active coating compositions. The compositions are useful for coating equipment to be submerged in the sea, for example, fish farming nets, boat hulls, and floats. It also finds use as self-disinfecting coatings in hospitals, air conditioning units, air conditioning ducts, and other places where a coating is exposed to attack by microorganisms, fungi, or algae.

DESCRIPTION OF THE PRIOR ART

The growth of algae and fungi, for example, on boat hulls, fish farming nets, floats and cages used in the aquaculture industry, on fiberglass roofs, and on patios, not only is unsightly but also causes more important failings. The hull of a boat or ship is considerably less efficient and the energy required to move the boat through the water increases. Fish farming nets are plugged by the algae growth, the movement of the water through the net is restricted, the oxygen supply to the fish decreases, and the fish are duffocated. The labor costs to keep the nets clean is very high. Cages for shellfish and oysters have the same problems. Growth on the floats of fish farm platforms supports the spread of unwanted organisms through the whole operation. Roofs, patios, balconies, walks, and the like can become slippery, when wet, if algae are present. In industry, algae growth fouls storage tanks, cooling systems, agricultural farm water storage tanks, fish hatcheries production tanks, and cooling tower structures. Hospital floors, walls, and all the interior have to be washed extensively to combat pathogenic microorganisms. In car air conditioning units and air conditioning ducts in hospitals and other buildings, the water condensation and warmth support the microorganisms' growth and the possibility of spreading of the pathogenic bacteria increases.

While the hull of a boat or walkway can be scrubbed to remove the unwanted growth, in case of a boat this involves removing the boat from the water and also a considerable amount of hard work. As a result, chemical approaches have been used. Compounds such as organic mercury, organic tin, organic copper, metallic copper, chlorinated phenols, and organic sulfur compounds have all been used in an attempt to reduce the growth of algae, fungi, and pathogenic microorganisms.

Where fish are grown in pens, there is a marked need for an antifouling coating for the nets. The coating is required to prevent the growth of marine organisms. The need has been met by the use of antifouling coatings containing heavy metals, for example, metallic copper and organic copper, arsenic, tin, and mercury. However, heavy metal coatings are environmentally undesirable, particularly in the marine environment because of bio-accumulation in marine life. It has been shown that these have an adverse effect upon shellfish beds and other coastal marine life, even in trace amounts. As a result, the use of heavy metals is now illegal in some jurisdictions.

A further use of bactericidal compositions is in hospitals where completely sterile environments are required to avoid Staphylococcus aureus infections.

Unfortunately, none of the systems developed so far is believed to be ideal. The prior art fails to teach coating compositions effective over a considerable period of time for destroying microorganisms such as algae and fungi.

SUMMARY OF THE INVENTION

The object of the present invention is to provide a coating or casting composition providing long-lasting biocidal properties with no toxicity to higher forms of life. This composition comprises a biocidal active cationic group and has the following general formula:

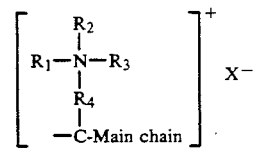

wherein $R_1$, $R_2$ and $R_3$ each represents unsubstituted or substituted alkyl or aryl groups or mixtures thereof having from 1 to 20 carbon atoms; $R_4$ represents an unsubstituted or substituted alkylene group directly bonded to the polymer backbone and having up to 10 carbon atoms; and $X^-$ represents an anionic group selected from $Cl^-$, $Br^-$, $I^-$, $OH^-$ or $HSO_4^-$.

Examples of the quaternary ammonium side chains in the above formula are n-alkyl dimethyl alkylene, di-n-alkyl alkylene, tri-n-alkyl alkylene, n-alkyl aryl alkyl alkylene, n-alkyl diaryl alkylene, and di-n-alkyl aryl alkylene ammonium salts.

The preferred quarternary ammonium compounds used to prepare the compounds of the invention have the following formulas:

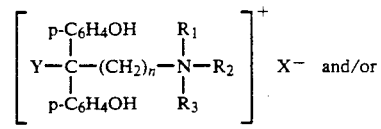

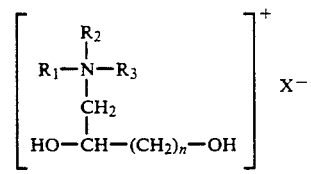

wherein $R_1$, $R_2$, and $R_3$ each represents an unsubstituted or substituted alkyl or hydroxyalkyl group or a derivative thereof having from 1 to 20 carbon atoms; Y represents hydrogen, an unsubstituted or substituted alkyl group, or a derivative thereof having up to 10 carbon atoms; and $X^-$ represents an anionic group such as $Cl^-$, $Br^-$, $I^-$, $OH^-$, or $HSO_4^-$.

The monomer units are repeated in the chain of the resin prepared therefrom. The polymer may be cured by any curing agent conventionally used for bis-phenol, glycol, or polyglycol resins.

The monomers of the invention may be prepared by the series of reactions shown in the following paragraphs. Those skilled in the art will recognize that other methods of synthesis may be used.

The reaction of formaldehyde, ketone, and dialkylamine or dialkylamine hydrochloride in the presence of hydrogen chloride at pH 3-5 is a known method of preparing Mannich bases (see Mannich, *Archiv der Pharmacie*, 255 (261), 1917; Beriohte 72 (506), 1939). If aqueous formaldehyde is used, the reaction is conducted in aqueous media. If paraformaldehyde is used, the reaction may be carried out in excess of ketone (liquid) or 95% ethanol. If paraformaldehyde and dialkylamine hydrochloride is used, the reaction is best conducted in iso-amyl alcohol.

EXAMPLE 1

A reaction flask is charged with 1.05 to 1.1 mols of diethanolamine hydrochloride, 1 mol equivalents of acetone, and 1.3 to 1.7 mol of aqueous formaldehyde. The pH of the mixture is adjusted between 3 and 5 by the addition of hydrochloric acid. The reactor is fitted with a reflux condenser and the reaction is conducted at a temperature of 57° C. for 5 to 8 hours under continuous mixing until the temperature starts to rise, i.e., until all of the acetone is consumed. The yield of 1-diethanolamino-3-butanone.HCl is approximately 66%. The residue includes an undetermined quantity of diethanolamine, diethanol-isopropylamine, diacetone alcohol, mesityl oxide, mesitylene, 2,6-dimethylhepta-2,5-diene-4-on 4 (Foron), 2,4-dimethylheptadiene(2,4)on(6), tetraethanoldiaminomethane, 1-diethanol-3-acetyl-4-methyl-4-hydroxypiperidine.

Any ketone, dialkylamine, alkylamine, or their salts may be used in the aforesaid reaction.

EXAMPLE 2

Phenols react with aldehydes and ketones in the presence of acid catalyst and at suitable temperatures to produce bis(4,4'-hydroxyphenol) alkanes. In this synthesis, where an aminoketone is used, aminoalkyl X,X-bis(4,4'-hydroxyphenyl) is formed. The reaction is commenced at the lowest temperature possible, i.e., about 65° C. The pH of the reacting compounds is kept in the range of from 1.5 to 1.7. The quantity of acidic catalyst and temperature has to be increased, depending on the reactants, in the order: formaldehyde→acetaldehyde→acetone→methylethyl ketone→methylbutyl ketone→methylpentyl ketone→. The molar ratio of phenol to carbonyl compound is about stoichiometric 2 to 1.

1-Diethanolamine-butyl-3,3-bis(4,4'-hydroxyphenyl) hydrochloride is prepared as follows: 1.22 moles of phenol are charged to the reactor, equipped with a reflux condenser, vacuum distillation accessories, a pH electrode and inlet ports, and a mixer. The reactor is heated to 65° C. and under continuous mixing a mixture of 1-diethanolamino-3-butanone hydrochloride and hydrochloric acid from Example 1 (0.66 mole) is slowly added. The reaction is carried out under reflux and continuous mixing. The temperature rises every hour about 5° C. and, during the last three hours, is kept at 100° C. After 10 hours, the reaction is terminated and the product is distilled under 100 mm vacuum at a temperature of 165° C. until all of the water and monomers are removed. The final product is 65% 1-diethanol aminobutyl-3,3-bis(4,4'-hydroxyphenyl) hydrochloride and 32% methane bis(4 4'-hydroxyphenyl) of theoretical, based on the phenol charged.

EXAMPLE 3

This example shows the reaction of tertiary amine hydrochloride with an alkyl chloride to produce the quaternary ammonium salt, 1-tetradecyl diethanolaminobutyl 3,3-bis(hydroxyphenyl) ammonium chloride. One mole of hexyl alcohol, 0.435 mole of tetradeoyl chloride, 0.435 mole of 1-diethanolaminobutyl 3,3-bis(4,4'-hydroxyphenyl) hydrochloride, and 0.145 mole of aluminum turnings are charged to a reactor equipped with a reflux condenser, vacuum distillation accessories, and a mixer. The reactor is heated to 157° C. and the reaction continues until all of the aluminum turnings are dissolved. The final product is the above quaternary ammonium salt in admixture with methane bis (4,4'-hydroxyphenyl), the alcoholic solvent and aluminum chloride.

The monomers synthesized according to Examples 1, 2, and 3 (or any other appropriate process) may be reacted to produce, for example, the epoxy polyethers. Epoxy polyether may be crosslinked by means of any conventional hardener at room temperature or at an elevated temperature below the decomposition temperature of the quaternary portion of the epoxy chain or of the epoxy chain itself.

EXAMPLE 4

Quaternary ammonium glycols may be prepared by the reaction of haloalkandiol with the tertiary amine in accordance with the following equation:

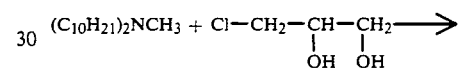

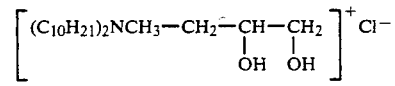

The same compound may be made by first reacting 1-glycerolamine with decylchloride to produce a tertiary amine and then, in turn, reacting the tertiary amine with methyl chloride.

More specifically, 1 mole of didecylmethylamine is reacted with 1 mole of 3-chloro-1,2-propanediol in a hexanol solvent under reflux conditions with continuous mixing at a temperature of 157° C. for 7 to 10 hours. The product of this synthesis may be used directly to produce an epoxy polyether by reacting, for example, the product of Example 4 with epichlorohydrin. Alternatively, the product of Example 4 may be reacted with ethylene oxide to produce quaternary polyglycols, which may be reacted with epichlorohydrin to form epoxy polyethers. The epoxy polyether is crosslinked by means of any conventional hardener at room or at elevated temperatures. The crosslinked quaternary ammonium polyglycolethers are highly flexible materials. They may be used as reactive diluents to increase flexibility and add the biocidal properties to the bisphenol-A epoxy resins, epoxy Novolac resins, melamine-formaldehydes, urea-formaldehydes, and phenol-formaldehyde polymers.

If epichlorohydrins or amines of tetrahydric alcohols are used in the reaction of Example 4 and the product of this reaction is reacted with maleic anhydride, or any other unsaturated polyfunctional anhydride, the resulting compound is a biocidal polyester with quaternary ammonium chains directly embedded in the structure of the polyester.

EXAMPLE 5

In the reactions of Examples 1 and 3 using didecylamine and decylchloride, the resulting monomer is tridecylaminobutyl-3,3-bis(4,4'-phenoxy) ammonium chloride.

EXAMPLE 6

In the reaction of Example 5, methylchloride is used instead of decylchloride. The resulting monomer is didecylmethylbutyl-3,3-bis(4,4'-hydroxyphenyl) ammonium chloride.

EXAMPLE 7

In the reaction of Example 4, instead of didecylmethylamine, tetradecyldimethylamine is used. The resulting monomer is tetradecyldimethylmethylglycol ammonium chloride.

EXAMPLE 8

In the reaction of Example 4, instead of didecylmethylamine, tridecylamine is used. The resulting monomer is tridecyl-1-methylglycol ammonium chloride.

EXAMPLE 9

The quaternary ammonium monomers from Examples 3, 4, 5, 6, 7, and 8 are reacted with epichlorohydrin to produce polyethers. The polyethers are dissolved in a mixture of n-propanol, cellosolve, methylisobutylketone, and n-butanol. The hardener, Wersamid 115×70 ® is diluted in a ratio of 1:1 with xylene. The ratio of epoxide to hardener is 1:1.25. The components are thoroughly mixed and let stand for 20 minutes as an induction period prior to application. As a control, Dow Epoxy Resin DER 331 ® - bisphenol A type is used. The polymer blends formed are referred to by the blend numbers shown in the following table:

TABLE 1

| Blend No. | Quaternary Ammonium Monomer |
| --- | --- |
| 1 | Control |
| 2 | Example 3 |
| 3 | Example 4 |
| 4 | Example 5 |
| 5 | Example 6 |
| 6 | Example 7 |
| 7 | Example 8 |

Glass microscope slides are coated with each blend (3 slides per blend) and cured for 7 days at room temperature. After curing, the slides are washed for 72 hours in running water. The washed slides are dried at 70° C. for 30 minutes and inoculated with an aerosol suspension of bacteria from a pneumatic atomizer. The inoculated surfaces are held in sterile petri dishes at 25° C. for 25 to 30 minutes before quantitation of viable organisms on the surface is accomplished by either wash recovery or Rodac plate techniques. The biocidal activity of epoxy surfaces is tested against Staphylococcus faecalis. Recovery of 1000 organisms from the control is used as a base to calculate the reduction of organisms caused by exposure to the surfaces treated in accordance with the invention. The surface contamination is measured and is reported in Table 2. The slide number in Table 2 represents the slide coated with the corresponding blend set forth in Table 1. Each sample is run in triplicate.

TABLE 2

| Slide No. | Surface Count |
| --- | --- |
| 1 | 1000 |
| 2 | 3 |
| 3 | 1 |
| 4 | 0 |
| 5 | 2 |
| 6 | 3 |
| 7 | 0 |

EXAMPLE 10

Here the procedure of Example 9 is followed, except that, instead of inoculation of the surfaces, the epoxy coated glass slides are placed in test tubes filled with inoculated broth and incubated for 72 hours. After 72 hours, the solutions in the test tubes are tested for antimicrobial properties. The broth is not antimicrobial. After removal from the broth, the slides are incubated at 25° C. for 1 hour. The blends 2, 3, 4, 5, 6, and 7 show the same biocidal power as reported in Example 9.

The materials used in Example 9 are used to treat different substrates such as molded products and foils by coating or casting the polymers thereon. The adhesion to metals, leather, wood, and plastics is reasonably good. The polymers are active against a broad spectrum of microorganisms, for example, Staphylococcus aureus, Staphylococcus faecalis, Escherichia coli, Areobacter aerogenes, Sacharomyces cerevisiae, Cyanophyta oscilaria, Chrysophyta sp., Aspergillus niger, and Triohoderma sp.

EXAMPLE 11

The quaternary ammonium monomers from Examples 3, 4, 5, 6, 7, and 8 are reacted in pyridine with phosgene to produce quaternar modified polycarbonates having biocidal properties.

EXAMPLE 12

The quaternary ammonium monomers from Examples 3, 4, 5, 6, 7, and 8 are reacted with hexamethylene diisocyanate or 4,4'-diphenylene diisocyanate to form polyurethanes which have long-term biocidal properties.

EXAMPLE 13

The quaternary ammonium monomers from Examples 3, 4, 5, 6, 7, and 8 are reacted with epichlorohydrin to produce polyethers. These polyethers are used with commercial hardeners to produce castings and foils which have long-term biocidal properties.

EXAMPLE 14

Following the procedures of Example 13, polyethers of quaternary ammonium modified epoxies are used as additives in different commercial epoxies. These demonstrate biocidal properties.

What is claimed is:

1. A composition selected from polyether resins, polyester resins, polycarbonate resins, polyurethane resins and alkyd resins, which contain directly bonded to their backbone repeating side chains of an active microbiocidal quaternary ammonium radical having a structural formula:

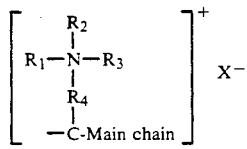

wherein $R_1$, $R_2$ and $R_3$ each represent unsubstituted or substituted alkyl or aryl groups or mixtures thereof having 1 to 20 carbon atoms; $R_4$ represents an unsubstituted or substituted alkylene group directly bonded to the polymer backbone and having up to 10 carbon atoms; and $X^-$ represents an anionic group selected from the group consisting of $Cl^-$, $Br^-$, $I^-$, $OH^-$ or $HSO_4^-$.

2. A composition selected from polyether resins, polyester resins, polycarbonate resins, polyurethane resins and alkyd resins, which contain directly bonded to their backbone repeating side chains of an active microbiocidal quaternary ammonium radical having a structural formula selected from the group consisting of:

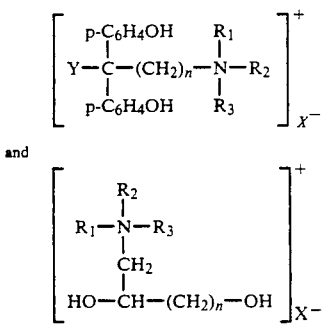

and mixtures thereof wherein $R_1$, $R_2$, and $R_3$ each represents an unsubstituted or substituted alkyl or hydroxyalkyl group or a derivative thereof having from 1 to 20 carbon atoms; Y represents hydrogen, an unsubstituted or substituted alkyl group, or a derivative thereof having up to 10 carbon atoms; and $X^-$ represents an anionic group selected from the group consisting of $Cl^-$, $Br^-$, $I^-$, $OH^-$, or $HSO_4^-$.

3. A composition according to claim 2 wherein the quaternary ammonium radical is n-alkyl dimethyl alkylene ammonium salt.

4. A composition according to claim 2 wherein the quaternary ammonium radical is a di-n-alkyl alkylene ammonium salt.

5. A composition according to claim 2 wherein the quaternary ammonium radical is a tri-n-alkyl alkylene ammonium salt.

6. A composition according to claim 2 wherein the quaternary ammonium radical is n-alkyl aryl alkyl alkylene ammonium salt.

7. A composition according to claim 2 wherein the quaternary ammonium radical is n-alkyl diaryl alkylene ammonium salt.

8. A composition according to claim 2 wherein the quaternary ammonium radical is di-n-alkyl aryl alkylene ammonium salt.

9. A method for controlling microorganisms on the surface of a substrate which comprises coating or casting on said substrate the composition of claim 2.

10. The method for controlling microorganisms of claim 9 wherein the substrate is a foil.

11. The method for controlling microorganisms of claim 9 wherein the substrate is submerged in the sea and the micro-organism is algae.

12. The method for controlling microorganisms of claim 9 wherein the substrate forms part of a boat hull, a fish farming net, a float, a metallic or wooden structure, a concrete wall, a wall board, a roof or a walkway.

13. The method for controlling microorganisms of claim 9 wherein the microorganism is a fungal, algal or bacterial growth and the substrate is organic.

14. The method of claim 13 wherein the substrate is exposed to humid conditions.

15. A method for controlling microorganisms on the surface of a molded product which comprises forming said product from raw, materials containing the composition of claim 2.

* * * * *